UNITED STATES PATENT OFFICE 2,087,985

METHOD OF TREATING EGG WHITES TO IMPROVE KEEPING AND WHIPPING QUALITIES

Carl H. McCharles and Harry A. Mulvany, Berkeley, Calif.

No Drawing. Application March 6, 1933, Serial No. 659,832

5 Claims. (Cl. 99—210)

This invention relates to a method of treating egg albumen, commonly known as egg whites, prior to drying, freezing, or otherwise preserving the same; the particular purpose of the treatment being to improve the keeping and whipping qualities of the egg whites.

There is a considerable demand for dried egg white in the food industries. Most of the material sold in this country for some years past has been imported from China, and although there are manufacturing concerns producing a product in this country, the process generally used is very similar to the Oriental.

The Oriental method of preparing egg white is to separate the whites from the yolks and then to pour the same through a fine sieve into wooden casks, holding about seven hundred pounds, after which the egg whites are subjected to fermentation. The material is then subjected to spontaneous fermentation for thirty-six to sixty hours, and is generally carried on under a temperature of about 70° F. As fermentation continues a scum rises to the top and is removed and discarded. A sediment also settles to the bottom of the casks. Fermentation is continued until samples show that bubbling has practically ceased and a sample that has been drawn off from a spigot, located about three inches from the bottom of the cask, also shows clear. Two ounces of aqua ammonia and about three ounces of alcohol per one hundred pounds of egg whites are stirred into the albumen after it is drawn from the casks. Thereafter the egg whites are dried and this may be accomplished by different methods; for instance, the material may be dried in a vacuum chamber under a temperature of approximately 50° C.; it may be dried in pans by blowing warm air over the product, or it may be dried in rooms held at a proper temperature.

In such a process there is no control over contamination or in the selection of the bacteria that cause fermentation. The consequences are that putrification is usually present.

Strange as it may seem, egg white separated from the yolk and immediately dried does not have the whipping properties of fresh egg whites, nor does it have the whipping qualities of egg white obtained by the fermentation process described. Egg whites that are to be preserved, whether by freezing, drying, or otherwise should have two qualities, to-wit, good keeping qualities and good whipping properties.

At the beginning of our investigation of the treatment of egg white for the purpose of improving its keeping and whipping qualities, we felt that it might be possible to obtain these desirable qualities without going through the process of fermentation or putrification. A large number of samples of dried egg whites found on the market were obtained and tested, particularly to determine the pH or hydrogen-ion concentration. The importance of hydrogen-ion concentration in determining the rate of denaturization and hydrolysis of proteins is beginning to be more clearly realized by investigators. As the hydrogen-ion concentration departs from the isoelectric region, commonly referred to as a neutral point, the rate of alteration of the protein increases. The hydrogen-ion concentration in egg whites accordingly appears to be an important factor in the treatment of egg whites as it is found that the hydrogen-ion concentration in fresh egg whites varies from 7.6 to 8.7, a rather marked departure from the isoelectric point which is approximately 4.7.

By experiments and tests we found the hydrogen-ion concentration which resulted in the best whipping properties, and we then attempted to obtain this same hydrogen-ion concentration with fresh unfermented egg whites by the addition of acid. After a considerable number of tests it was found that by adding different amounts of hydrochloric acid up to .15% and then holding the mixture of egg white and acid at 50° C., that the hydrogen-ion concentration, which was considerably increased by the addition of the acid, would change and that the hydrogen-ion concentration in the egg white would return to approximately normal concentration in about fifty-five hours. This period, however, proved too long as under certain conditions fermentation would set in and this was not desired. Subsequent experiments were conducted and it was found that by adding .15% hydrochloric acid to the egg whites and then subjecting the mixture to a vacuum of about twenty-five inches and a temperature of approximately 50° C., the egg whites would return to substantially normal hydrogen-ion concentration in about five hours, as compared with fifty-five hours, and it was later found that if the material was vigorously stirred while subjected to the above specified temperature and a still higher vacuum, that the time could be reduced to three hours or less.

When somewhat more acid is added the pH value fails to change under treatment with temperature and vacuum. For instance, an addition of .22% all at once usually prevents a change in pH, but this amount and more can be added in several portions with heat and vacuum treatment between addition of acid without preventing the change of the pH value.

During the many tests it has been observed that carbon dioxide gas $CO_2$ is liberated as the hydrogen-ion concentration increases. It accordingly appears to be essential to free the egg whites of carbon dioxide gas, as the quicker it is removed the quicker the return of the egg whites toward their original or normal pH value. Vigorous stirring and application of a comparatively high vacuum seems to materially promote liberation of $CO_2$ and probably account for the great reduction in total time required when comparison is made with the fermentation method.

In actual practice the egg whites are separated from the yolks in any quantity desired. The pH value is tested, sufficient hydrochloric acid is added to reduce the numerical value to approximately pH 5.8. The mixture of acid and egg whites is thoroughly stirred and is immediately placed in a vacuum chamber. It is here subjected to a vacuum of approximately twenty-eight inches and to a temperature of 50° C. It is possible to employ a still higher temperature but that is dangerous as coagulation of the albumen may take place. The material is vigorously stirred while subjected to an elevated temperature and reduced pressure and it is found that the pH value returns to 7.5 or 8 in from two and one-half to three hours. The material may be removed at any time prior to completion of this reaction for immediate use, or it may be frozen, dried, or condensed, as desired. Best results are invariably obtained by interrupting this reaction before a pH value of 7.0 has been reached. The material has been dried in both vacuum driers and spray driers and the product obtained has good keeping and whipping properties. It is entirely free from undesirable odors and tastes and when whipped a texture resembling that of fresh egg whites is obtained, yet the increase in volume during whipping is, as a rule, very much better than fresh egg whites.

We have also found that when egg whites have been treated as above specified and then frozen that the frozen material is also about twenty-five percent better in whipping properties than frozen untreated egg whites. The process of heat treating in a vacuum undoubtedly destroys a number of the various forms of bacteria that are present and probably accounts for the better keeping qualities. It is, however, understood that the temperature is not sufficient to destroy all bacteria, and particularly spores.

It has also been found that the material treated, as specified, will stand in air for a longer time without fermentation than fresh untreated egg whites. We have found hydrochloric acid to be most practical for this purpose but good results can be obtained by using sulphuric or tartaric acid, the quantity of acid and not the kind being the important factor.

Numerous trials with various amounts of several acids clearly indicate an optimum reduction in pH for production of maximum whipping properties. The close correspondence between this amount of acid and that required to displace stoichiometrically the $CO_2$ naturally occurring in egg whites, along with the actual escape of the $CO_2$, indicates a relationship between the removal of $CO_2$ and production of maximum whipping properties which is certainly concomitant and probably causal. The hydrolysis of protein compounds, caused by changes in pH, heating and displacement of $CO_2$, probably contributes to the cause of improvement.

The HCl added has no detrimental action on the food properties of the material. While we have described removal of $CO_2$ gas by agitation and vacuum, it may also be accomplished by passing $CO_2$ free gas through the mixture or by precipitation as an insoluble carbonate, and while we have described the reduction of the numerical value of the pH by direct addition of acid substances it can also be accomplished by electrolysis or the introduction of certain types of acid producing enzymes.

Egg whites treated as above described until they will yield a satisfactory product when dried in a vacuum drier may not do so when dried in a spray drier. In the latter the liquid to be dried is atomized under high pressure into a current of heated air of low velocity and large volume. The particles of liquid are so small that they dry almost instantaneously and fall to the floor as minute dry spherules of the solid material originally contained in the liquid. The time of drying is so much shorter (seconds instead of hours) that important changes in pH and other properties may occur in the vacuum drier which do not occur in the spray drier.

In order to obtain a satisfactory product from the spray drier more acid is usually required and it is often necessary to add it in several stages with temperature and vacuum treatment in between.

When acid, heat and vacuum treatment have been inadequate to produce a satisfactory powder in a spray drier, the desirable whipping properties can still be recovered by subsequent treatment with air of proper humidity and temperature. For instance a powder with pH value above 6.7 usually does not whip satisfactorily, but if it contains eight or more percent moisture and is subjected to a temperature of 50° C. the whipping properties will be fully restored in twenty-four hours; also in about three days at 40° C. and eight days at 35° C., etc.; and in a few weeks at room temperature in the neighborhood of 20° C. excessive temperature and moisture tend to darken the color of the product.

During this treatment of the dried product the pH value drops considerably and usually serves as a fairly accurate test of when the process is complete. Best results are obtained after the pH falls below 6.7.

This improvement in the dried product does not occur in material untreated before drying.

While this and other features have been more or less specifically described, we wish it understood that changes may be resorted to within the scope of the appended claims, and that various forms of apparatus may be employed in the treatment herein described.

Having thus described our invention, what we claim and desire to secure by Letters Patent is—

1. A method of improving the keeping and whipping qualities of liquid egg whites which consists in adding approximately .15% hydrochloric acid, agitating the mixture in a vacuum at a temperature of approximately 50° C. until the hydrogen-ion concentration decreases to a pH value not more than 7.0, and then drying the mixture.

2. A method of improving the keeping and whipping qualities of liquid egg whites which consists in adding approximately .15% hydrochloric acid, agitating the mixture in a vacuum at a temperature of approximately 50° C. until the hydrogen-ion concentration decreases to a pH value not more than 7.0, and then freezing the mixture.

3. A method of improving the keeping and whipping qualities of liquid egg whites which consists in adding approximately .15% hydrochloric acid, agitating the mixture in a vacuum at a temperature of approximately 50° C. until the hydrogen-ion concentration decreases to a pH value not more than 7.0, and then condensing the mixture.

4. A method of improving the keeping and whipping qualities of liquid egg whites which consists in adding a sufficient quantity of acid to bring the pH value to approximately 5.8, agitating the mixture in a vacuum at a temperature slightly below the coagulating point of the liquid egg whites until the hydrogen ion concentration decreases to a pH value of not more than 7.0, and then drying the mixture.

5. A method of improving the whipping and keeping qualities of liquid egg whites which consists in increasing the hydrogen ion concentration to an approximate pH value of 5.8 by the addition of acid, subjecting the material to a temperature slightly below the coagulating point of the liquid egg whites and simultaneously subjecting the material to a vacuum to materially decrease the hydrogen ion concentration, again increasing the hydrogen ion concentration to an approximate pH value of 5.8 by the addition of further acid, and subjecting the egg whites to temperature and vacuum until the hydrogen ion concentration is again decreased to a pH value of not more than 7.0 and then spray drying the material.

CARL H. McCHARLES.
HARRY A. MULVANY.